US012726341B2

(12) United States Patent
Singh et al.

(10) Patent No.: US 12,726,341 B2
(45) Date of Patent: Sep. 1, 2026

(54) METHOD AND SYSTEM FOR GENERATING DECOY AND SIGNAL PULSES FOR QUANTUM KEY DISTRIBUTION PROTOCOL

(71) Applicant: QuNu Labs Private Limited, Bengaluru (IN)

(72) Inventors: Dilip Kumar Singh, Gurgaon (IN); Krishnan Rajesh Kumar, Bengaluru (IN); Shashank Gupta, Fatehpur (IN)

(73) Assignee: QuNu Labs Private Limited, Bengarluru (IN)

( * ) Notice: Subject to any disclaimer, the term of this patent is extended or adjusted under 35 U.S.C. 154(b) by 56 days.

(21) Appl. No.: 18/983,521

(22) Filed: Dec. 17, 2024

(65) Prior Publication Data

US 2025/0202690 A1 Jun. 19, 2025

(30) Foreign Application Priority Data

Dec. 18, 2023 (IN) ............................ 202341086479

(51) Int. Cl.
*H04L 9/08* (2006.01)
*H04B 10/50* (2013.01)
*H04B 10/516* (2013.01)

(52) U.S. Cl.
CPC ......... *H04L 9/0852* (2013.01); *H04B 10/503* (2013.01); *H04B 10/5161* (2013.01)

(58) Field of Classification Search
None
See application file for complete search history.

(56) References Cited

U.S. PATENT DOCUMENTS 7,502,476 B1 3/2009 Trifonov et al.
8,718,485 B2 * 5/2014 Tanaka .................. H04L 9/0858 398/185

(Continued)

FOREIGN PATENT DOCUMENTS

CN 105515767 B 10/2020

OTHER PUBLICATIONS

Inoue et al, "Differential-Phase-Shift Quantum Key Distribution Using Coherent Light", Physical Review Journals, Phys. Rev A 68, DOI: https://doi.org/10.1103/PhysRevA.68.022317, Published on Aug. 17, 2003, 2 pages.

(Continued)

*Primary Examiner* — Backhean Tiv
(74) *Attorney, Agent, or Firm* — Ziegler IP Law Group, LLC.

(57) ABSTRACT

A method for generating decoy and signal pulses for a Decoy differential phase shift (DDPS) quantum key distribution (QKD) protocol includes emitting laser light from a laser source and modulating intensity of the laser light using at least one intensity modulator. The intensity of the laser light is modulated to generate the decoy pulses having a first mean photon number (MPN) and the signal pulses having a second MPN greater than the first MPN. The first and second MPNs are associated with the operation of the at least one intensity modulator operable based on a first quantum random number generator (QRNG). The method further includes modulating phase of the decoy and signal pulses using a phase modulator operable based on a second QRNG, and attenuating the modulated decoy and signal pulses, using at least one attenuator, for being transmitted under the DDPS QKD protocol.

20 Claims, 4 Drawing Sheets

(56) References Cited

U.S. PATENT DOCUMENTS

| | | | | |
|---|---|---|---|---|
| 9,819,418 | B2 * | 11/2017 | Nordholt | H04B 10/501 |
| 2019/0260478 | A1 * | 8/2019 | Lucamarini | H04B 10/548 |
| 2022/0283781 | A1 * | 9/2022 | Lim | G06F 7/588 |

OTHER PUBLICATIONS

India Patent Office, First Examination Report, Application No. 202341086479, Mailed Feb. 20, 2024, 2 pages.

India Patent Office, Hearing Notice, Application No. 202341086479, Mailed Jun. 16, 2024, 2 pages.

* cited by examiner

METHOD AND SYSTEM FOR GENERATING DECOY AND SIGNAL PULSES FOR QUANTUM KEY DISTRIBUTION PROTOCOL

TECHNICAL FIELD

The present disclosure relates to methods and systems for generating decoy and signal pulses for a Decoy differential phase shift (DDPS) quantum key distribution (QKD) protocol.

BACKGROUND

Quantum key distribution (QKD) is a promising technology for secure communication in a variety of applications, including military, financial, and government communications, as well as for secure communication between individuals and organizations in general.

The QKD protocol uses quantum mechanics to secure an exchange of secret keys between two parties. One such QKD protocol is a Differential Phase Shift (DPS) QKD protocol, in which the sender (Alice) sends a series of photons (signal pulses) to the receiver (Bob) over a quantum channel. The photons are randomly polarized or modulated either as '0' or 'π' under the DPS QKD protocol. Another QKD protocol is a Decoy DPS QKD protocol, in which sender also adds decoy pulses to stream of signal pulses, which are used to detect eavesdropping attempts. Typically, said QKD protocols use a weak coherent source as a single photon source to generate either signal pulses or both signal and decoy pulses. In such sources, there is significant chances of occurrence of multiphoton pulses due to bunching phenomenon. Such pulses are vulnerable to photon number splitting attacks. Accordingly, mean photon number (MPN) of such pulses are kept around 0.1 due to said security consideration. However, the disadvantage of using a low MPN may reduce an overall efficiency of said QKD protocols. For example, the use of low MPN may cause low key generation rate for said QKD protocols, limit an operational distance for said QKD protocols, increase susceptibility of said QKD protocols to various types of noise and errors and so forth.

Therefore, in light of the foregoing discussion, there exists a need to overcome the aforementioned drawbacks associated with existing QKD protocols.

SUMMARY

The present disclosure provides methods and systems for generating decoy and signal pulses for a Decoy differential phase shift (DDPS) quantum key distribution (QKD) protocol. The present disclosure provides a solution to the existing problem associated with conventional QKD protocols and provides the DDPS QKD protocol with enhanced overall efficiency. The DDPS QKD protocol of the present disclosure is configured to operate with the signal and decoy pulses having increased and distinct mean photon numbers (MPNs). An objective of the present disclosure is to provide a solution that overcomes at least partially the problems encountered in the prior art and provides the DDPS QKD protocol configured to have a high key generation rate, a longer operational distance and a reduced susceptibility to various types of noise and errors.

One or more objectives of the present disclosure is achieved by the solutions provided in the enclosed independent claims. Advantageous implementations of the present disclosure are further defined in the dependent claims.

In first aspect, an embodiment of the present disclosure provides a method for generating decoy and signal pulses for a Decoy differential phase shift (DDPS) quantum key distribution (QKD) protocol, the method comprises:

- emitting laser light from a laser source;
- modulating intensity of the laser light using at least one intensity modulator,
  - wherein the intensity of the laser light is modulated to generate the decoy pulses having a first mean photon number (MPN) and the signal pulses having a second MPN greater than the first MPN, and
  - wherein the first and second MPNs are associated with the operation of the at least one intensity modulator operable based on a first quantum random number generator (QRNG);
- modulating phase of the decoy and signal pulses using a phase modulator operable based on a second QRNG; and
- attenuating the modulated decoy and signal pulses, using at least one attenuator, for being transmitted under the DDPS QKD protocol.

Optionally, the at least one intensity modulator comprises a single intensity modulator, configured to operate based on a base and a top of a transfer curve used for calibrating bias voltages for the intensity modulation of the single intensity modulator, and wherein the base and the top of the transfer curve corresponds to the first and second MPNs of the decoy and signal pulses, respectively.

Optionally, the first QRNG is operable to randomly select the base and the top from the transfer curve to determine the bias voltages used for modulating the decoy and signal pulses with the first and second MPNs, respectively, and wherein the first and second MPNs for the modulated decoy and signal pulses, respectively, are in a range of 0.1 to 0.2 MPN and 0.5 to 0.9 MPN, respectively.

Optionally, the first QRNG is further operable to select the base and the top percentagewise from the transfer curve to define percentages of generation of the decoy and signal pulses, respectively, based on a user-defined security threshold, and wherein the percentages of the decoy and signal pulses are in a range of 20% to 50% and 80% to 50%, respectively.

Optionally, the at least one intensity modulator comprises first and second intensity modulators, each configured to operate based on a transfer curve tuned with bias voltages for the intensity modulation thereof, and wherein the transfer curve of the first intensity modulator is tuned to operate with a bias voltage responsible to generate the decoy pulses with the first MPN and the second intensity modulator is configured to operate with a bias voltage responsible to generate the signal pulses with the second MPN.

Optionally, the transfer curve of the first and second intensity modulators are tuned to operate with bias voltages responsible to generate:

- the decoy pulses with the first MPN in a range of 0.1 to 0.2 MPN, and
- the signal pulses with the second MPN in a range of 0.5 to 0.9 MPN.

Optionally, the method further comprises

- splitting the laser light using a first coupler into a first laser light for being directed towards the first intensity modulator and a second laser light for being directed towards the second intensity modulator; and
- combining modulated first and second laser light, using a second coupler, into a modulated single laser light being directed towards the phase modulator.

Optionally, the method further comprises selecting one of the first and second intensity modulators, to receive the first and second laser light, respectively, from the laser source based on the first QRNG, and wherein percentages of selection of the first and second intensity modulators are in a range of 20% to 50% and 80% to 50%, respectively, for generating the decoy and signal pulses, respectively, based on a user-defined security threshold.

In second aspect, an embodiment of the present disclosure provides a system for generating decoy and signal pulses for a Decoy differential phase shift (DDPS) quantum key distribution (QKD) protocol, the system comprises:

a laser source for emitting laser light;

at least one intensity modulator for modulating intensity of the laser light, wherein the intensity of the laser light is modulated to generate the decoy pulses having a first mean photon number (MPN) and the signal pulses having a second MPN greater than the first MPN, and wherein the first and second MPNs are associated with the operation of the at least one intensity modulator operable based on a first quantum random number generator (QRNG);

a phase modulator, for modulating phase of the decoy and signal pulses, operable based on a second QRNG; and at least one attenuator for attenuating the modulated decoy and signal pulses for being transmitted under the DDPS QKD protocol.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
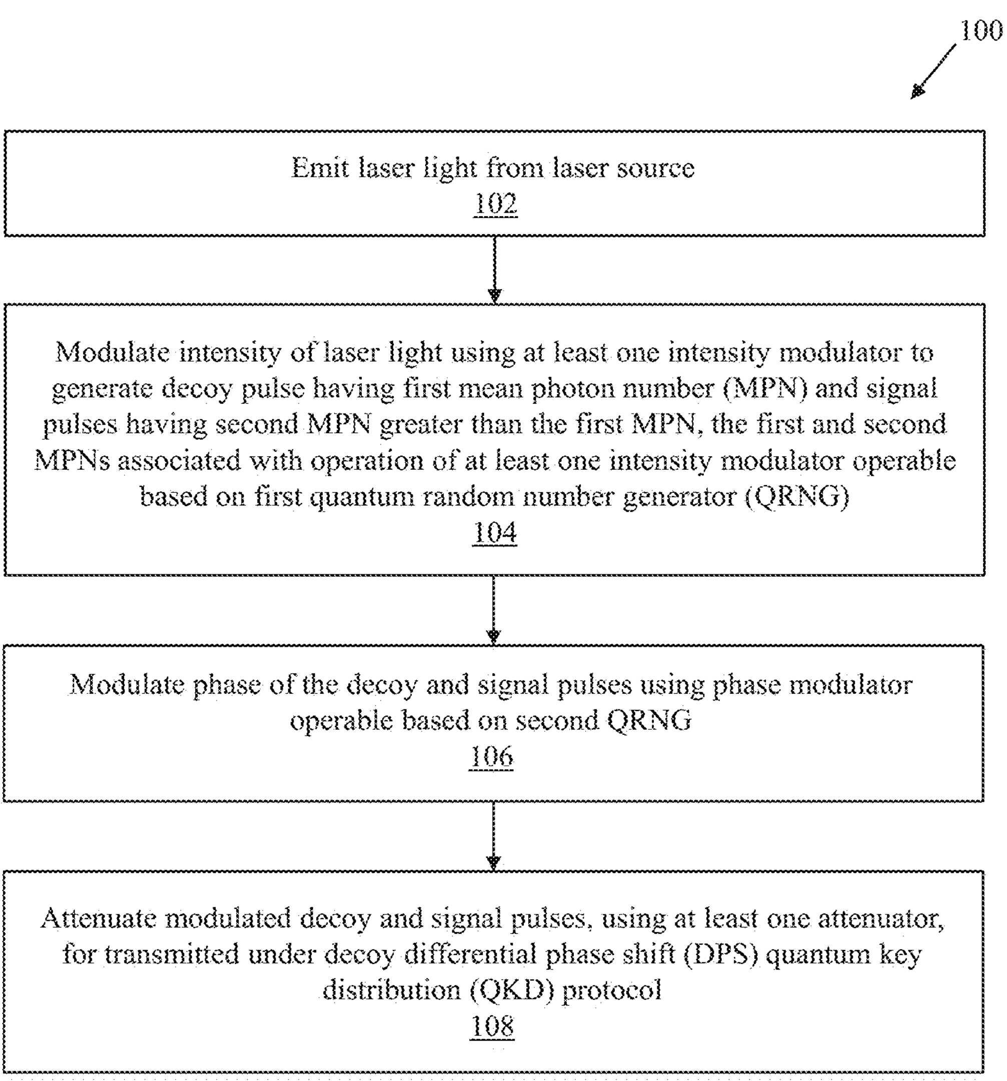
FIG. 1 illustrates steps of a method for generating decoy and signal pulses for a Decoy differential phase shift (DDPS) quantum key distribution (QKD) protocol, in accordance with an embodiment of the present disclosure.

The present disclosure provides the aforementioned methods and systems for generating decoy and signal pulses for a Decoy differential phase shift (DDPS) quantum key distribution (QKD) protocol (or quantum regime). The methods and systems improve an overall efficiency and security of a quantum key distribution protocol. Specifically, the decoy and signal pulses for the DDPS QKD protocol are generated with increased and distinct mean photon numbers (MPNs), which enhances secure key rate generation and maximizes isolation between the MPNs of the decoy and signal pulses. The increased MPN of the signal and decoy pulses allows for a greater operational distance. This is because the higher secure key rate generation enables to maintain a sufficient signal-to-noise ratio (SNR) over longer distances, allowing for secure key generation at a greater distance. Further, the isolation between the MPNs of the decoy and signal pulses effectively eliminates the threat of photon number splitting (PNS) attacks. Moreover, the methods and systems of the present disclosure allow in achieving different MPN for the decoy and signal pulses without adding any extra components to a conventional QKD system. This provides greater flexibility in designing the DDPS QKD systems for different applications and operating conditions. It also simplifies the implementation of the DDPS QKD protocol and reduces overall cost of implementation. The methods and systems of the present disclosure accordingly provide improved security, efficiency, and flexibility compared to conventional QKD protocol, making it a promising solution for secure communication. Referring now to FIG. 1, illustrated are steps of a method 100 for generating decoy and signal pulses for a DDPS QKD protocol, in accordance with an embodiment of the present disclosure. At step 102, laser light is emitted from a laser source. At step 104, intensity of the laser light is modulated using at least one intensity modulator. The intensity of the laser light is modulated to generate the decoy pulses having a first mean photon number (MPN) and the signal pulses having a second MPN greater than the first MPN. Also, the first and second MPNs are associated with the operation of the at least one intensity modulator operable based on a first quantum random number generator (QRNG). At step 106, phase of the decoy and signal pulses are modulated using a phase modulator operable based on a second QRNG.

At step 108, the modulated decoy and signal pulses are attenuated, using at least one attenuator, for being transmitted under the DDPS QKD protocol.

The steps 102 and 108 are only illustrative and other alternatives can also be provided where one or more steps are added, one or more steps are removed, or one or more steps are provided in a different sequence without departing from the scope of the claims herein.

It will be evident to a person skilled in the art that the DDPS QKD (or DDPS QKD) protocol is a method for secure communication that utilizes intensity and phase modulation of light signals. In this protocol, a sender sends a series of light signals to a receiver, with each signal encoded with a specific intensity and a phase to represent a bit value of a secure key to be generated. To prevent eavesdropping, the sender also sends decoy pulse of different intensities, as compared to signal pulses, which enable the receiver to estimate an error rate of a quantum channel used by the sender and the receiver. The receiver then randomly selects a subset of the signals to measure their intensity and phase. After the measurements, the sender and receiver compare the bit values of the subset to determine if there was any interference or tampering with the channel. If the error rate is higher than expected, the protocol is aborted. If the error rate is within the expected range, the sender and receiver proceed to use remaining bit values corresponding to the signal pulses to generate the secure key to be shared for secure communication. The use of decoy signals and differential phase shift enables the DDPS QKD protocol to detect eavesdropping attempts and improve the security of the key distribution process.

As mentioned herein above, at step 102 the laser light is emitted from the laser source. In an embodiment, the laser source may be a Weak Coherent State (WCS) laser source operable to generate a continuous beam of laser light. The WCS laser source may be a solid-state laser or a semiconductor laser, that emits the laser light. Further, the WCS laser source may be a continuous-wave laser that generates a weak, coherent beam of laser light at a specific wavelength. The specific wavelength may be typically in an infrared range of about 1530 to 1570 nanometres (nm). In an example, the laser source of the present disclosure is operable to emit the continuous beam of laser light having a wavelength of 1547.72 nm.

At step 104, the intensity of the laser light is modulated using at least one intensity modulator. The intensity modulator is a device that is operable to modulate the intensity of the laser light. In an example, the intensity modulator is an electro-optic device, which modulates the intensity of the laser light based on an applied voltage. Typically, the intensity modulator may include key components, such as, input and output ports to receive the laser light and provide modulated laser light, respectively; electrodes that are used to apply the voltage required for modulating the intensity of the laser light; and optical waveguide(s) made of high-quality optical material that acts a medium through which the laser light travels and is designed to confine the laser light within a small area to ensure efficient modulation.

As mentioned herein above, the intensity of the laser light is modulated to generate the decoy pulses having the first mean photon number (MPN) and the signal pulses having the second MPN greater than the first MPN. The term "mean photon number" refers to an average number of photons in each pulse of the laser light that is transmitted over a quantum channel between the sender and the receiver. In the present disclosure, the MPN can be calculated by dividing the total number of photons in the laser light pulses by the number of laser light pulses. For example, if the laser source generates 100 million photons per second, then a MPN of 0.1 can be achieved if 1 billion pulses are transmitted per second and 100 million photons are detected per second (assuming that the photon detection efficiency is 100%). Therefore, MPN can be controlled by changing an average power per pulse. For example, based a given MPN and the laser source following Poissonian distribution, fraction of vacuum pulses, can be considered to calculate single photon pulses and multi photon pulses. It is to be understood that this does not mean that each pulse contains 0.1 photons, but rather that a probability of having a certain number of photons in each pulse is such that an average number of photons per pulse is 0.1.

The terms "decoy pulses" and "signal pulses" refer to optical pulses (or the laser light pulses) that are used to generate a secure key between two parties, i.e., sender (or Alice) and a receiver (or Bob). Typically, the signal pulses contain a secret key information that the sender wants to send to the receiver, whereas the decoy pulses are designed to provide a baseline measurement for the quantum channel, against which the signal pulses can be compared to detect any potential eavesdropping. In other words, the decoy pulses serve as a reference for the expected signal pulse behaviour, and any deviation from this behaviour can indicate the presence of an eavesdropper. In the present disclosure, the intensity of the laser light is modulated (or configured to have different MPNs) to generate the decoy and signal pulses.

As mentioned herein above, the first and second MPNs are associated with the operation of the at least one intensity modulator, which is operable based on the first QRNG. According to an embodiment, the at least one intensity modulator comprises a single intensity modulator, configured to operate based on a base and a top of a transfer curve used for calibrating bias voltages for the intensity modulation of the single intensity modulator. Further, the base and the top of the transfer curve corresponds to the first and second MPNs of the decoy and signal pulses, respectively. In simple words, the method 100 of the present disclosure can be implemented using one (or a single) intensity modulator to encode quantum states of the signal and decoy pulses.

The terms "first and second MPNs" mentioned herein refer to two different intensity levels or power levels of the signal and decoy pulses. These intensity levels are typically chosen to ensure that the signal pulses contain enough photons (relatively higher number of photons as compared to single photon pulses) to be detected by the receiver, while the decoy pulses are weaker and used for calibration and security purposes. In the present disclosure, the decoy and signal pulses are generated with increased and distinct MPNs, as compared to decoy and signal pulses of a conventional QKD protocol. According to an embodiment, the first and second MPNs for the modulated decoy and signal pulses, respectively, are in a range of 0.1 to 0.2 MPN and 0.5 to 0.9 MPN, respectively. For example, the single intensity modulator is configured to modulate the intensity levels of the laser light in a manner such that the decoy and signal pulses are modulated (or encoded) with the first and second MPNs being 0.1 and 0.5, respectively. Similarly, the decoy and signal pulses may be modulated with the first and second MPNs being 0.2 and 0.5, 0.1 and 0.6, 0.2 and 0.6, 0.1 and 0.7, 0.2 and 0.7, 0.1 and 0.8, 0.2 and 0.8, 0.1 and 0.9, or 0.1 and 0.9, respectively.

According to an embodiment, the MPN is calculated using following mathematical formula:

$$MPN=(P*\tau)/(h*c/\lambda)$$

in which, P=average optical power $\tau$=pulse duration h=Planck's constant c=speed of light in a vacuum $\lambda$=wavelength of the laser light Therefore, if $\lambda$ is 1547.72 nm and pulse duration is 1 ns, then following one-to-one corelation between the MPN and the average optical power can be derived. For example, for MPN of 0.1 the average optical power would be $3.24\times10^{-11}$ Watt (W). Similarly, for MPN of 0.2, 0.5, 0.6, 0.7, 0.8 and 0.9, the average optical power would be $6.49\times10^{-11}$ W, $1.62\times10^{-10}$ W, $1.94\times10^{-10}$ W, $2.27\times10^{-10}$ W, $2.59\times10^{-10}$ W and $2.92\times10^{-10}$ W, respectively.

As mentioned herein above, the single intensity modulator is configured to operate based on the base and the top of the transfer curve used for calibrating the bias voltages for the intensity modulation of the single intensity modulator. For example, bias voltages are used to set operating point of the single intensity modulator on the transfer curve, which may be a plot of an extinction ratio as a function of the DC voltage applied to the single intensity modulator. Further, the base and top of the transfer curve define the minimum and maximum extinction ratios that is configured to be achieved by the single intensity modulator and are set by adjusting the bias voltages, this will be further explained in detail in conjunction with FIG. 2 herein later.

It will be evident to a person skilled in the art that the "transfer curve" would be a plot of extinction ratio (expressed in dB) as a function of the DC voltage applied to the single intensity modulator. The "extinction ratio" is a measure of the difference in optical power levels between on and off states of the single intensity modulator.

Therefore, the transfer curve describes the relationship between the DC voltage applied to the single intensity modulator and the resulting extinction ratio. Further, the "base and top" of the transfer curve refer to the DC voltages at which the extinction ratio of the modulator is configured to be at its lowest and highest values, respectively. The lowest and highest values of the DC voltages define the minimum and maximum extinction ratios, respectively, which is configured to be achieved by the modulator. The base of the transfer curve is typically set by adjusting the DC bias voltage applied to the modulator to achieve the lowest possible extinction ratio, while the top of the transfer curve is similarly set by adjusting the bias voltage to achieve the highest possible extinction ratio. Moreover, the "bias voltages" are the DC voltages applied to the electrodes of the intensity modulator that define the base and top of the transfer curve.

According to an embodiment, the first QRNG is operable to randomly select the base and the top from the transfer curve to determine the bias voltages used for modulating the decoy and signal pulses with the first and second MPNs, respectively. It will be evident to a person skilled in the art that first QRNG is a device configured to generate random numbers which may be in the form of binary digits (0 and 1). For example, the first QRNG may work based on the measurement of the polarization state of a photon. The polarization state of the photon can be measured using a polarization beam splitter, which separates the photon into two paths with orthogonal polarizations. The presence or absence of the photon in each path can be detected using single-photon detectors, and the binary digits can be generated based on the outcome of these measurements. The resulting sequence of 0's and 1's is a truly random number sequence that is not predictable or reproducible. In principle, a QRNG can utilize various quantum phenomena to generate random numbers. Some examples of these quantum phenomena include the time of arrival of single photons and Bell non-local correlations. These phenomena provide a basis for generating ontic (inherently random) numbers. In the present disclosure, the main function of the first QRNG is to generate random numbers, which are used to select the bias voltages that are applied to modulate decoy and signal pulses. For example, the generation of a random number '0' may cause selection of the base of the transfer curve for the operation of the single intensity modulator. The selection of the base of the transfer curve is associated with a DC voltage at which the extinction ratio of the single intensity modulator is configured to be at its lowest, thereby causing generation of a decoy pulse modulated with the first MPN. Similarly, the generation of a random number '1' may cause selection of the top of the transfer curve for the operation of the single intensity modulator. The selection of the top of the transfer curve is associated with a DC voltage at which the extinction ratio of the single intensity modulator is configured to be at its highest, thereby causing generation of a signal pulse modulated with the second MPN that is greater than the second MPN. It will be evident to a person skilled in the art that the bias voltage of the single intensity modulator directly controls the average optical power of the modulated signal. Accordingly, the bias voltage, the average optical power and the MPNs of the signal and decoy pulses are all related to each other through the transfer curve and the selection of the base or top by the QRNG. The first QRNG accordingly ensures the randomness and security of the DDPS QKD protocol of the present disclosure by generating numbers that are unpredictable and may not be intercepted by an eavesdropper. Such arrangement of the single intensity modulator and the first QRNG, is further explained in detail in conjunction with FIG. 3 herein later.

In an embodiment, the first QRNG is further operable to select the base and the top percentagewise from the transfer curve to define percentages of generation of the decoy and signal pulses, respectively, based on a user-defined security threshold. As explained herein above, the selection of the base and the top of the transfer curve for the operation of the single intensity modulator causes generation of the decoy and signal pulses, respectively, therefore the percentage of selection of the base and the top would define the percentages of generation of the decoy and signal pulses, respectively. Further, the percentages of generation of the decoy and signal pulses is based on the user-defined security threshold, which is a predetermined level of security required for the DDPS QKD protocol of the present disclosure based on a desired level of protection against eavesdropping or interception. The user-defined security threshold could be based on various factors, such as the sensitivity of the information being transmitted, the potential risk to the DDPS QKD protocol or the users, and the level of security required by the regulatory standards or policies. Accordingly, the selection of the base and the top from the transfer curve could be adjusted to achieve the desired percentage of generation of the decoy and signal pulses, based on the user-defined security threshold.

According to an embodiment, the percentages of the decoy and signal pulses are in a range of 20% to 50% and 80% to 50%, respectively, based on the user-defined security threshold. It will be evident to a person skilled in the art that the security generally increases with an increase in the percentage of decoy pulses. Since, the purpose of decoy pulses is to detect potential eavesdropping attacks on a quantum channel by monitoring the characteristics of the decoy and signal pulses. Therefore, by increasing the percentage of decoy pulses, the DDPS QKD protocol of the present disclosure improves its ability to detect such attacks and increase the overall security of the communication. In an embodiment, the user-defined security threshold may be defined or expressed in levels such as 1, 2, 3, 4 and 5. For example, when the user-defined security threshold is level 5 then the percentages of the decoy and signal pulses may be in a range of 50% and 50%, respectively. Similarly, when the user-defined security threshold is level 4, level 3, level 2 and level 1 then the percentages of the decoy and signal pulses may be in a range of 40% and 60%, 30% and 70%, 20% and 80%, and 10% and 90%, respectively.

It is to be understood that, when the method 100 is implemented with the help of the single intensity modulator (explained herein above), the first QRNG is configured (or programmed) to randomly select the base and the top from the transfer curve to determine the bias voltages used for modulating the decoy and signal pulses with the first and second MPNs, and to select the base and the top from the transfer curve to define percentages of generation of the decoy and signal pulses, respectively, based on the user-defined security threshold. In simple words, the first QRNG randomly selects the base and the top from the transfer curve for modulating the decoy and signal pulses with the first and second MPNs of about 0.2 and 0.7, respectively, and the percentages of generation of the decoy and signal pulses can be in a range of 50% and 50%, respectively, based on the user-defined security threshold of level 5.

According to another embodiment of the present disclosure, the method 100 is implemented with more than one intensity modulator (i.e., the single intensity modulator explained herein above). For example, the method 100 is implemented with the first and second intensity modulators. Each of the first and second intensity modulators is configured to operate based on a transfer curve tuned with bias voltages for the intensity modulation thereof. The transfer curve of the first intensity modulator is tuned to operate with a bias voltage responsible to generate the decoy pulses with the first MPN and the second intensity modulator is configured to operate with a bias voltage responsible to generate the signal pulses with the second MPN. Specifically, the transfer curves of the first and second intensity modulators are tuned to operate with a fixed bias voltage (unlike the base and top of the transfer curve of the single intensity modulator, explained herein above) for generating decoy and signal pulses with corresponding fixed MPNs, respectively. The transfer curve of the first intensity modulator is tuned to operate with a bias voltage that generates the decoy pulses with the first MPN, while the second intensity modulator is configured to operate with a bias voltage that generates the signal pulses with the second MPN, which is greater than the first MPN.

According to an embodiment, the method 100 implemented with the first and second intensity modulators further comprises randomly selecting one of the first and second intensity modulators based on the first QRNG. In simple words, the function of the first QRNG is to randomly select one of the first and the second intensity modulators and thereby generating (or modulating the laser light by the first and the second intensity modulators to generate) the decoy and signal pulses with the first and second MPNs, respectively. As explained herein above, the first QRNG may generate random numbers (sequence of 0's and 1's), which are used to select one of the first and the second intensity modulators. For example, the generation of a random number '0' may cause selection of the first intensity modulator having the transfer curve tuned to operate with the bias voltage that generates the decoy pulses with the first MPN. Similarly, the generation of a random number '1' may cause selection of the second intensity modulator having the transfer curve tuned to operate with the bias voltage that generates the signal pulses with the second MPN. The first QRNG accordingly ensures the randomness and security of the DDPS QKD protocol of the present disclosure by generating numbers that are unpredictable and may not be intercepted by the eavesdropper. Such arrangement of the first and second single intensity modulators and the first QRNG, is further explained in detail in conjunction with FIG. 4 herein later.

In an embodiment, the transfer curve of the first and second intensity modulators are tuned to operate with bias voltages responsible to generate: the decoy pulses with the first MPN in a range of 0.1 to 0.2 MPN, and the signal pulses with the second MPN in a range of 0.5 to 0.9 MPN, respectively. For example, the first and the second intensity modulators are configured to modulate the intensity levels of the laser light in a manner such that the decoy and signal pulses are modulated (or encoded) with the first and second MPNs being 0.1 and 0.5, respectively. Similarly, the transfer curves of the first and second intensity modulators are tuned to operate with the fixed bias voltage for generating decoy and signal pulses with corresponding fixed MPNs, respectively, such as the first and second MPNs being 0.1 and 0.6, 0.1 and 0.7, 0.1 and 0.8, 0.1 and 0.9, 0.2 and 0.5, 0.2 and 0.6, 0.2 and 0.7, 0.2 and 0.8, or 0.2 and 0.9, respectively.

According to an embodiment, the method 100 implemented with the first and second intensity modulators further comprises splitting the laser light using a first coupler into a first laser light for being directed towards the first intensity modulator and a second laser light for being directed towards the second intensity modulator; and combining modulated first and second laser light, using a second coupler, into a modulated single laser light being directed towards a phase modulator. In an example, the first and second couplers may include two or more optical fibres or waveguides that are fused or coupled together that allows the splitting and combining of optical signals between the fibres or waveguides. The first coupler splits the laser light into first and second laser light (or into first portion and second portion of the laser light). In this case, the laser light is input to one of the ports of the first coupler. The first coupler is designed to distribute the optical power between the output ports according to a specific ratio. By adjusting the coupling ratio, the first coupler can be made to split the laser light into two output ports with a specific power distribution. In an example, the first coupler can split the laser light into two output ports causing the generation of the first and second laser light each having different power distribution. In other words, the first coupler is operable to generate two streams of laser light, using two output ports, each having a certain percentage of power distribution associated therewith. For example, a first port of the two output ports would carry a first percentage of laser light defining the first laser light and a second port of the two output ports would carry a second (or remaining) portion of the laser light defining the second laser light. In an example, the first coupler may be operationally configured to be 50:50, 10:90 or any other combination based on a user-defined security threshold. Specifically, percentages of distribution of the laser light into two output ports causing the generation of the first and second laser light each having different power distribution in a range of 20% to 50% and 80% to 50%, respectively. Further, the generation of the first and second laser light would correspond to generating the decoy and signal pulses, respectively, based on the user-defined security threshold, which is explained in detail herein later.

The first and second laser light to be generated and directed towards the first QRNG, which randomly directs the first laser light towards the first intensity modulator and the second laser light towards the second intensity modulator. This causes the first and second intensity modulators to randomly receive the first and second laser light, respectively, from the first QRNG and accordingly generate the decoy and signal pulses in a random order. The second coupler combines the modulated first and second laser light (i.e., the modulated decoy and signal pulses generated by the first and second intensity modulators, respectively), into a modulated laser light being directed towards the phase modulator. In this case, the modulated first and second laser light are input to separate ports of the second coupler. The second coupler is designed to combine the optical power from the input ports into a single output port. This allows the second coupler to generate a stream of modulated laser light to be directed towards the phase modulator for further processing. Therefore, at a given instant, the second coupler is operable to generate either a stream of decoy or signal pulses.

According to an embodiment, the one of the first and second intensity modulators is selected, to receive the first and second laser light, respectively, from the laser source based on the first QRNG. Further, percentages of selection of the first and second intensity modulators are based on the generation of the first and second laser light (i.e., in a range of 20% to 50% and 80% to 50%, respectively), for generating the decoy and signal pulses, respectively, based on the user-defined security threshold. As explained herein above, the first QRNG is operable to randomly direct the first and second laser light towards the first and second intensity modulators, however the percentages of selection of the first and second intensity modulators based on a user-defined security threshold. In simple words, the percentages for directing the first and second laser light towards the first and second intensity modulators are based on the user-defined security threshold. Therefore, the first QRNG is configured (or programmed) to randomly direct the first and second laser light towards the first and second intensity modulators, respectively.

According to an embodiment, the percentages of directing the first and second laser light towards the first and second intensity modulators, respectively, cause the percentages of selection of the first and second intensity modulators thereby causing the generation of the decoy and signal pulses, respectively, based on the user-defined security threshold. For example, when the user-defined security threshold is level 5 then the percentages of selection of the first and second intensity modulators by the first QRNG may be in a range of 50% and 50%, respectively. Similarly, when the user-defined security threshold is level 4, level 3, level 2 and level 1 then the percentages of selection of the first and second intensity modulators may be in a range of 40% and 60%, 30% and 70%, 20% and 80%, and 10% and 90%, respectively. Specifically, if the user-defined security threshold is 2, then first coupler will direct 20% of the laser light to the first intensity modulator and 80% of the light to the second intensity modulator, for generation of the 20% decoy and 80% signal pulses.

As explained herein above, at step 106, the phase of the decoy and signal pulses are modulated using the phase modulator, which is operable based on a second QRNG. It will be evident to a person skilled in the art that the phase modulator encodes information in the phase of light signals (i.e., the decoy and signal pulses). For example, the phase modulator incorporates a random phase of either ‘0’ or ‘pi’ for each pulse of the decoy and signal pulses received from the at least one intensity modulator, explained herein above. In an example, the phase modulator works by applying an electric field to a crystal, which changes a refractive index of the crystal. This, in turn, causes a phase shift in the decoy and signal pulses that passes through the crystal. By varying the voltage applied to the crystal, it is possible to modulate the phase of the decoy and signal pulses, which can be used to encode information. Further, it will be evident to a person skilled in the art that the second QRNG generates random numbers to control the phase modulator. For example, the second QRNG generates a random number (either ‘0’ or ‘1’) that determines a voltage to be applied to the crystal in the phase modulator, which then modulates the phase (either as ‘0’ or ‘pi’) of the decoy and signal pulses. This ensures that the phase modulation is truly random and unpredictable, making it more difficult for an eavesdropper to intercept and decode the information being sent between the sender and the receiver. The use of the second QRNG to control the phase modulator enhances the security of the DDPS QKD protocol of the present disclosure.

At step 108, the modulated decoy and signal pulses are attenuated, using at least one attenuator, for being transmitted under the DDPS QKD protocol. It will be evident to a person skilled in the art that the at least one attenuator is a device that reduces amplitude of a signal (i.e., the decoy and signal pulses) without introducing any significant distortion or noise. The at least one attenuator involves using a resistive element to reduce the power level of the signal, i.e., the decoy and signal pulses. The attenuation level is determined by the ratio of the output power to the input power of the signal, which is expressed in decibels (dB). According to an embodiment, the decoy and signal pulses from the phase modulator are received by three variable optical attenuators (VOA) connected in series, for being transmitted to the receiver under the DDPS QKD protocol.

According to an embodiment, the attenuated decoy and signal pulses from the sender (Alice) are received the receiver (Bob) under the DDPS QKD protocol. For example, the receiver may include a one-bit delayed Mach-Zehnder interferometer for processing the attenuated decoy and signal pulses. It will be evident to a person skilled in the art that the one-bit delayed Mach-Zehnder interferometer is a device that splits the signal (i.e., the attenuated decoy and signal pulses) into two paths, with one path having a one-bit delay relative to the other. The receiver may further include single-photon detector(s) that are positioned at each output port of the interferometer. The single-photon detectors are configured to detect the presence of single photons, which forms the fundamental building blocks of the secure key. By using a one-bit delayed Mach-Zehnder interferometer and single-photon detectors, the receiver is capable of accurately detecting the photons in the received signal and generating the secure key with the sender under the DDPS QKD protocol of the present disclosure.

Figure 2:
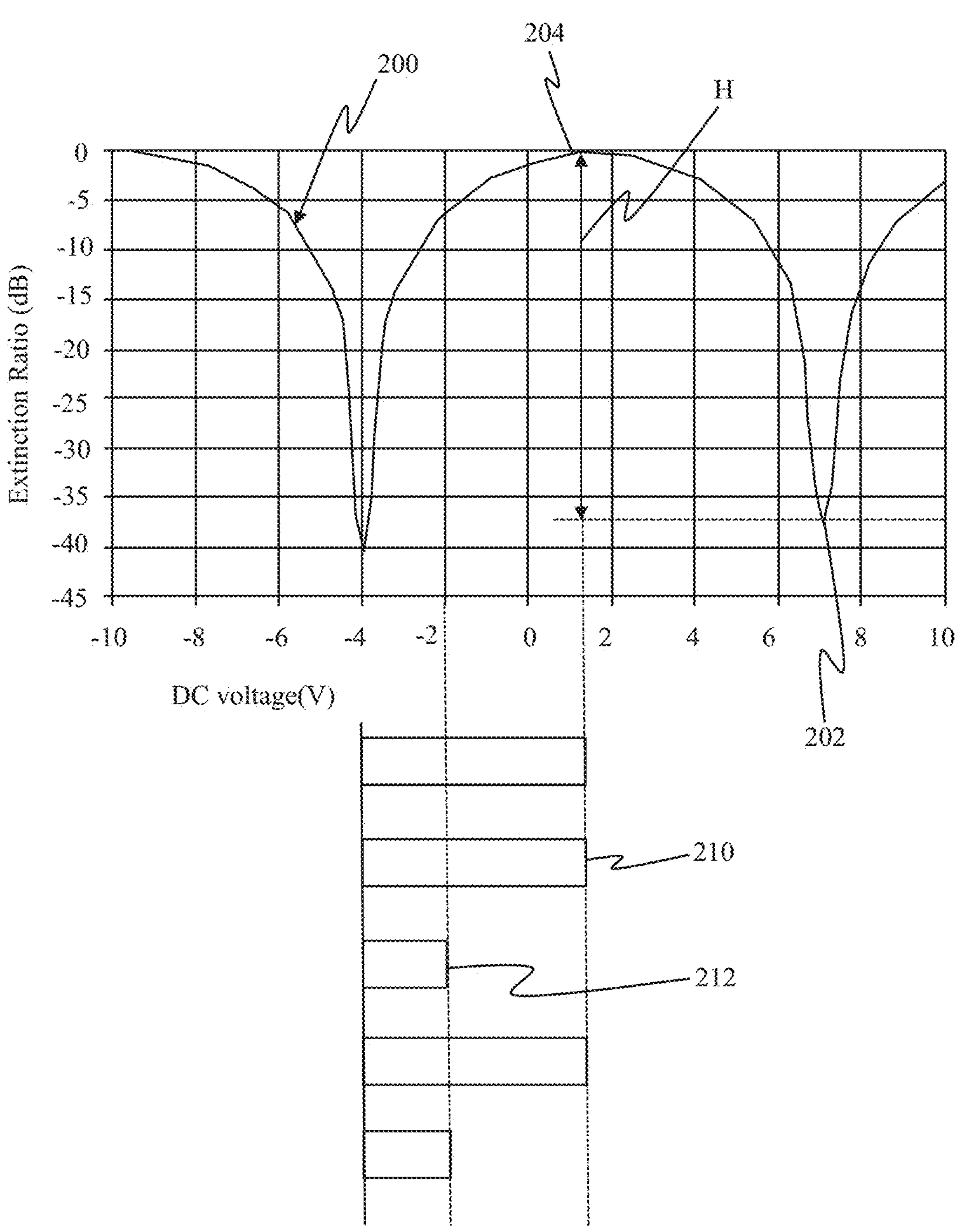
FIG. 2 illustrates a graph depicting an exemplary transfer curve used for calibrating bias voltages for an intensity modulation to be used with the method of FIG. 1, in accordance with an embodiment of the present disclosure.

Referring now to FIG. 2, illustrated is a graph depicting an exemplary transfer curve 200 used for calibrating bias voltages for an intensity modulation to be used with the method of FIG. 1, in accordance with an embodiment of the present disclosure. Specifically, FIG. 2 depicts the transfer curve 200 used for calibrating the bias voltages of the “single intensity modulator”, which is explained herein above in conjunction with FIG. 1 and further shown in FIG. 3. The graph illustrated in the FIG. 2 includes an X-axis shown to include DC voltage expressed in volts (V), and a Y-axis shown to include Extinction Ration expressed in decibels (dB). As shown, the transfer curve 200 includes a base 202 and a top 204, which refer to DC voltages at which the extinction ratio of the single intensity modulator is configured to be at its lowest and highest values, respectively. Further, as explained herein above, the first QRNG is operable to randomly select the base 202 and the top 204 from the transfer curve 200 to determine the bias voltages used for modulating the decoy and signal pulses with the first and second MPNs, respectively. It will be evident to a person skilled in the art that the graph also depicts a height “H” of the transfer curve 200 that defines a range of an intensity modulation (i.e., various combination of the base and the top of the transfer curve 200), which can be selected as a function of the DC voltage. The height H defines a limit on the difference between the MPNs of the decoy and signal pulses, provided fixed attenuation is applied to both decoy and signal pulses. FIG. 2 also illustrates a bar diagram depicting exemplary DC voltage values 210, 212, associated with the generation of signal and decoy pulses, respectively, and such DC voltage values 210, 212 correspond to different heights of the transfer curve 200. As shown, a height of the transfer curve 200 corresponding to the DC voltage value 210 for the generation of the signal pulse is more than a height of the transfer curve 200 corresponding to the DC voltage value 212 for the generation of the decoy pulse.

The present disclosure also relates to the second aspect as described above. Various embodiments and variants disclosed above, with respect to the aforementioned first aspect, apply mutatis mutandis to the second aspect. More specifically, various embodiments and variants disclosed above, with respect to the aforementioned method 100 (the first aspect) explained in conjunction with FIG. 1, apply mutatis mutandis to the system (the second aspect), which will be explained in conjunction with FIGS. 3 and 4. It will be evident to a person skilled in the art that the system(s) of the present disclosure typically explains the implementation of the method 100 at a component or a hardware level.

Figure 3:
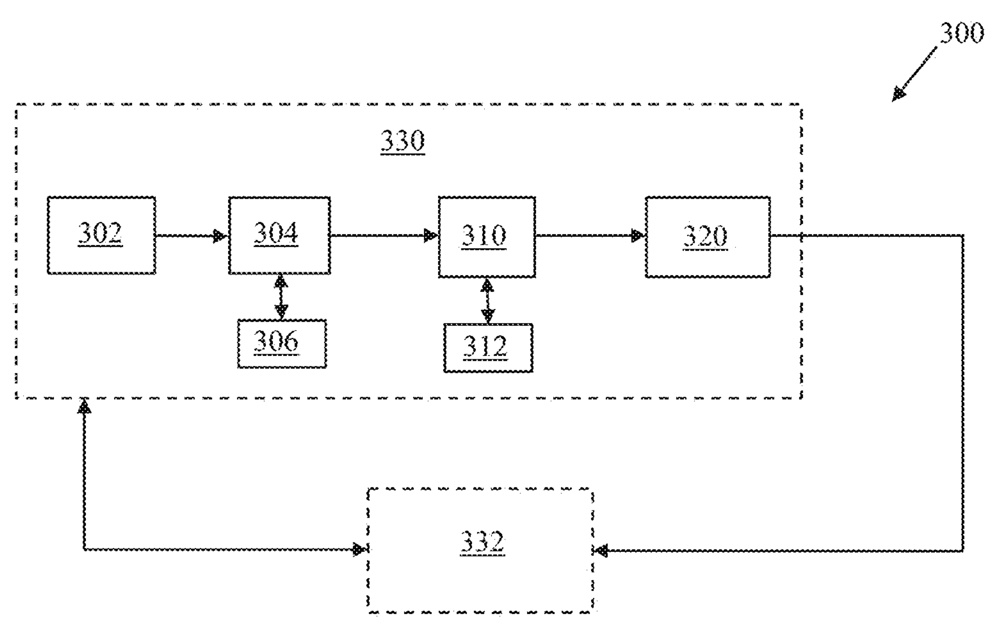
FIG. 3 illustrates a block diagram of a system for generating decoy and signal pulses for a DDPS QKD protocol, in accordance with an embodiment of the present disclosure.

Referring now to FIG. 3, illustrated a block diagram of a system 300 for generating decoy and signal pulses for a DDPS QKD protocol, in accordance with an embodiment of the present disclosure. As shown, the system 300 includes a laser source 302 for emitting laser light and at least one intensity modulator (such as the single intensity modulator 304, explained herein above in conjunction with FIG. 1) for modulating intensity of the laser light. The intensity of the laser light is modulated to generate the decoy pulses having a first mean photon number (MPN) and the signal pulses having a second MPN greater than the first MPN, and the first and second MPNs are associated with the operation of the single intensity modulator 304 operable based on a first quantum random number generator (QRNG) 306. The system 300 further includes a phase modulator 310, for modulating phase of the decoy and signal pulses, operable based on a second QRNG 312; and at least one attenuator, such as an attenuator unit 320 having three VOAs, for attenuating the modulated decoy and signal pulses for being transmitted under the DDPS QKD protocol. It will be apparent to a person skilled in the art that the system 300 primarily relates to a sender 330, which is responsible for or configured to generate the decoy and signal pulses for being transmitted under the DDPS QKD protocol. As shown, the system 300 also includes a receiver 332 responsible for or configured to detect the decoy and signal pulses for being received under the DDPS QKD protocol. The receiver 332 may include components, such as, one-bit delayed Mach-Zehnder interferometer and single-photon detectors, not shown.

Optionally, the system 300 may include a radio frequency driver (RF driver, not shown) operatively coupled to the single intensity modulator 304 and the first QRNG 306. The RF driver is operable to generates radio frequency signals, which are used to modulate the intensity of laser pulses in the single intensity modulator 304. Typically, the RF driver is operable based on intensity modulator-bias (IM-bias), consisting of IM-DC (Intensity Modulator Direct Current) and IM-RF (Intensity Modulator Radio Frequency), which controls the operation of the single intensity modulator 304 and allows for the creation of varying quantum states with different MPNs. The RF driver applies the bias voltage, known as IM-bias, which includes IM-DC and IM-RF. The IM-DC sets the baseline intensity level of laser pulses when no RF signal is applied, while IM-RF superimposed on IM-DC dynamically modulates the intensity. The RF Driver's precise control over IM-DC and IM-RF enables adjustments in the modulation characteristics, i.e., MPNs. In the present embodiment, the random values generated by the first QRNG 306 are used to control parameters of the RF signals generated by the RF Driver, such as phase shifts.

Optionally, the single intensity modulator 304 is configured to operate based on a base and a top of a transfer curve (explained in conjunction with FIG. 2) used for calibrating bias voltages for the intensity modulation of the single intensity modulator 304. The base and the top of the transfer curve corresponds to the first and second MPNs of the decoy and signal pulses, respectively.

Optionally, the first QRNG 306 is operable to randomly select the base and the top from the transfer curve to determine the bias voltages used for modulating the decoy and signal pulses with the first MPN in a range of 0.1 to 0.2 MPN and the second MPN in a range of 0.5 to 0.9 MPN, respectively.

Optionally, the first QRNG 306 is further operable to select the base and the top percentagewise from the transfer curve to define percentages of generation of the decoy pulses in a range of 20% to 50% and the signal pulses in a range of 80% to 50%, respectively, based on a user-defined security threshold.

Figure 4:
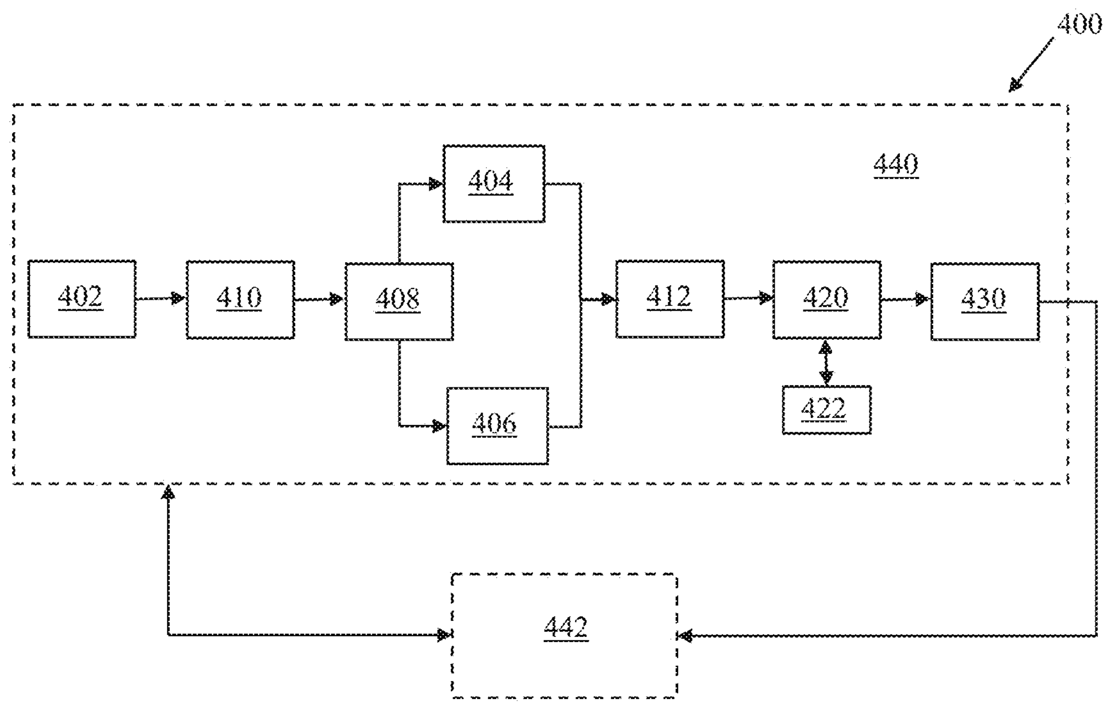
FIG. 4 illustrates a block diagram of a system for generating decoy and signal pulses for a DDPS QKD protocol, in accordance with another embodiment of the present disclosure.

Referring now to FIG. 4, illustrated is a block diagram of a system 400 for generating decoy and signal pulses for a DDPS QKD protocol, in accordance with another embodiment of the present disclosure. As shown, the system 400 includes a laser source 402 for emitting laser light; at least one intensity modulator (such as the first and second intensity modulators 404, 406, explained herein above in conjunction with FIG. 1) for modulating intensity of the laser light. The intensity of the laser light is modulated to generate the decoy pulses having a first mean photon number (MPN) and the signal pulses having a second MPN greater than the first MPN, and the first and second MPNs are associated with the first and second intensity modulators 404, 406 operable based on a first quantum random number generator (QRNG) 408. The system 400 also includes a first coupler 410 for splitting the laser light into a first laser light for being directed towards the first intensity modulator 404 and a second laser light for being directed towards the second intensity modulator 406. As shown, the first and second laser light are directed towards the first and second intensity modulator 404, 406, respectively, via the first QRNG 408. The system 400 also includes a second coupler 412 for combining modulated first and second laser light into a modulated single laser light being directed towards a phase modulator 420. The phase modulator 420 modulates phase of the decoy and signal pulses based on a second QRNG 422. The system 400 also includes at least one attenuator, such as an attenuator unit 430 having three VOAs, for attenuating the modulated decoy and signal pulses for being transmitted under the DDPS QKD protocol. It will be apparent to a person skilled in the art that the system 400 also primarily relates to a sender 440, which is responsible for or configured to generate the decoy and signal pulses for being transmitted under the DDPS QKD protocol. As shown, the system 400 also includes a receiver 442 responsible for or configured to detect the decoy and signal pulses for being received under the DDPS QKD protocol. The receiver 442 may include components, such as, one-bit delayed Mach-Zehnder interferometer and single-photon detectors, not shown.

Optionally, the system 400 may include a pair of radio frequency drivers (RF drivers, not shown), such as a first RF driver operatively coupled to the first intensity modulator 404 and a second RF driver operatively coupled to the second intensity modulator 406. The first and second RF drivers are operatively coupled first QRNG 408. As explained herein above, the first and second RF drivers are operable to generates radio frequency signals, which are used to modulate the intensity of laser pulses in the first and second intensity modulators 404, 406. Typically, the first and second RF drivers are operable based on intensity modulator-bias (IM-bias), consisting of IM-DC (Intensity Modulator Direct Current) and IM-RF (Intensity Modulator Radio Frequency), which controls the operation of the first and second intensity modulators 404, 406 and allows for the creation of varying quantum states with different MPNs. The first and second RF drivers apply the bias voltage, known as IM-bias, which includes IM-DC and IM-RF. The IM-DC sets the baseline intensity level of laser pulses when no RF signal is applied, while IM-RF superimposed on IM-DC dynamically modulates the intensity. The RF Driver's precise control over IM-DC and IM-RF enables adjustments in the modulation characteristics, i.e., MPNs. In the present embodiment, the random values generated by the first QRNG 408 are used to control parameters of the RF signals generated by the RF Driver, such as phase shifts.

Optionally, each of the first and second intensity modulators 404, 406 is configured to operate based on a transfer curve tuned with bias voltages for the intensity modulation thereof. The transfer curve of the first intensity modulator 404 is tuned with a bias voltage responsible to generate the decoy pulses with the first MPN and the transfer curve of the second intensity modulator 406 is tuned with a bias voltage responsible to generate the signal pulses with the second MPN.

Optionally, the transfer curve of the first and second intensity modulators 404, 406 are tuned with bias voltages responsible to generate: the decoy pulses with the first MPN in a range of 0.1 to 0.2 MPN, and the signal pulses with the second MPN in a range of 0.5 to 0.9 MPN.

Optionally, one of the first and second intensity modulators 404, 406 is randomly selected to receive the first and second laser light, respectively, from the laser source 402 (via the first coupler 410) based on the first QRNG 408.

Optionally, percentages of selection of the first and second intensity modulators 404, 406 are in a range of 20% to 50% and 80% to 50%, respectively, for generating the decoy and signal pulses, respectively.

The methods and systems of the present disclosure are configured to generate the decoy and signal pulses for the DDPS QKD protocol with increased and distinct mean photon numbers (MPNs), which enhances secure key rate generation, a greater operational distance and increased isolation between the MPNs of the decoy and signal pulses. For example, the increment in secure key rate generation is due to increase in the MPN of the signal pulses (0.7 from 0.1). Further, at 100 km (20 dB loss) with 4% Quantum Bit Error Rate (QBER), the secure key rate generation without decoy pulses and signal pulse at 0.1 MPN is about 35 kbps, whereas the secure key rate generation without decoy pulses and signal pulse at 0.7 MPN is about 45 kbps. Therefore, the methods and systems of the present disclosure causes increment in the secure key rate generation by around 28.5%. Furthermore, the greater operational distance means that the DDPS QKD can generate secure keys at a point-to-point distance of 150 km with single photon avalanche photodiodes. Moreover, the increased or maximized isolation between the MPNs of the decoy and signal pulses further enables in decreasing susceptibility of the DDPS QKD protocol to various types of noise and errors, which may occur during generation and detection of the decoy and signal pulses.

Figure 5:
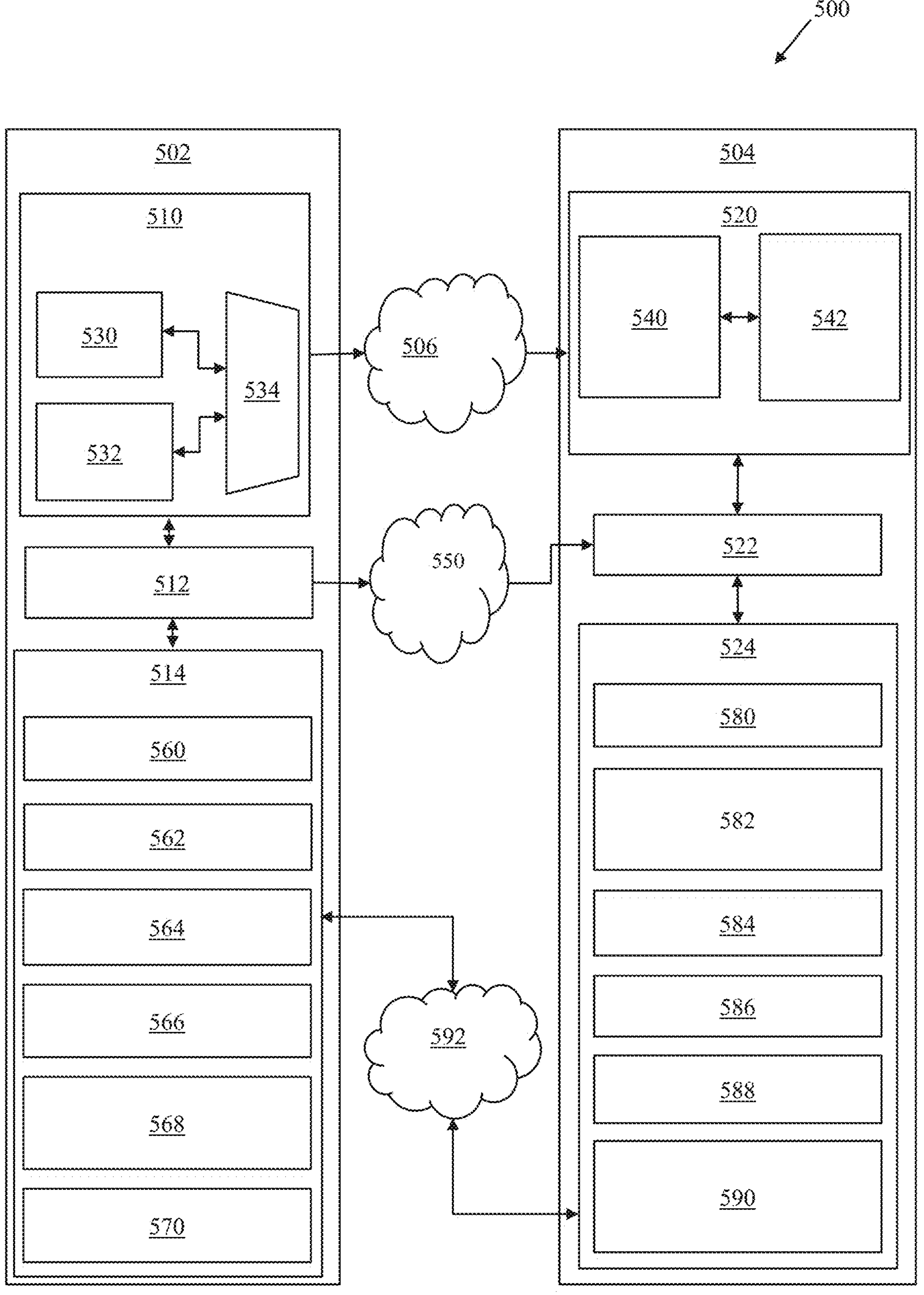
FIG. 5 illustrates a block diagram of a system for quantum key distribution, in accordance with an exemplary embodiment of the present disclosure.

Referring now to FIG. 5, illustrated is a block diagram of a system 500 for quantum key distribution, in accordance with an exemplary embodiment of the present disclosure. It will be evident that the system 500 is associated with the implementation of the methods and systems for generating decoy and signal pulses for DDPS QKD protocol, explained herein above in conjunction with FIGS. 1-4. As shown, the system 500 includes a transmitter 502 and a receiver 504 communicably coupled to each other by a quantum channel 506. The transmitter 502 refers to a component or entity responsible for generating quantum states, typically using quantum properties like polarization or modulation, and sending these quantum states to a receiving entity over the quantum channel 506. The receiver 504 refers to the receiving entity responsible for receiving the quantum states sent by the transmitter 502. The receiver 504 performs measurements and operations on these quantum states to extract the cryptographic key information securely. Further, the quantum channel 506 refers to the communication medium or pathway through which quantum states (e.g., photons) are transmitted from the transmitter 502 to the receiver 504.

The transmitter 502 includes a decoy and signal state preparation unit 510, a synchronization unit 512 and a post-processing unit 514. Similarly, the receiver 504 includes a state detection unit 520, a synchronization unit 522 and a post-processing unit 524.

The decoy and signal state preparation unit 510 includes a light source 530 and a modulation unit 532 operable to generate quantum pulses 534. The light source 530 is a component responsible for generating photons. For example, the light source 530 may be a laser diode. The modulation unit 532 is a component that further alters the quantum pulses to encode information, such as binary bits, onto the quantum states. It prepares the quantum states for use as decoy or signal states. For example, when polarization encoding is used, the modulation unit 532 may consist of polarizing beam splitters and liquid crystal modulators. By applying varying voltage to such modulators, the polarization state of the photons can be manipulated to encode information, such as '0' and '1', onto the quantum states.

The state detection unit 520 includes a demodulation unit 540 and a single photon detection unit 542. The demodulation unit 540 is an integral part of the state detection unit 520, and responsible for reversing the modulation applied to quantum states during their preparation. Specifically, its function is to recover the encoded information, typically in the form of binary bits. For example, the demodulation unit 540 may consist of optical components like polarizing beam splitters and detectors. These components are used to measure the polarization states of incoming photons. By analyzing the polarization properties, the demodulation unit can decode the information encoded during modulation. For instance, horizontal polarization may correspond to 0, and vertical polarization may correspond to 1. The single photon detection unit 542 detects individual photons with high precision, distinguishing them from multiple-photon events. In an example, the single photon detection unit 542 may include avalanche photodiodes (APDs) and superconducting nanowire detectors, that can register the presence of a single photon. As shown, the signal state preparation unit 510 and state detection unit 520 are communicably coupled to each other by the quantum channel 506.

As shown, each of the transmitter 502 and the receiver 504 includes the synchronization unit 512 and the synchronization unit 522, respectively. The synchronization unit 512 within the transmitter ensures precise timing and synchronization of quantum states' transmission. The synchronization unit 512 may achieve precise synchronization through various mechanisms, such as time-stamping, pulse shaping, or phase-locking. One common example is pulse shaping using electro-optic modulators (EOMs). These modulators allow for precise control of the timing and shape of emitted quantum pulses. In an example, the synchronization unit 512 may employ EOMs to shape the quantum pulses' polarization states according to a predefined pattern. This ensures that the emitted quantum pulses align with the expected timing at the receiver's end. Similarly, the synchronization unit 522 within the receiver 504 is configured to align the reception of quantum states with the timing and properties of the transmitted states. The synchronization unit 522 achieves synchronization by coordinating the arrival of quantum states with the timing of detectors and measurement devices 542. In an example, in the synchronization unit 522, time-correlation techniques may involve using coincidence detectors or time-to-digital converters (TDCs). For instance, if the transmitter 502 sends quantum states at specific time intervals, the receiver's synchronization unit 522 uses these detectors to ensure that measurements are made precisely when the quantum states are expected to arrive. By achieving this alignment, the receiver 504 can accurately process and measure the quantum states. As shown, the synchronization unit 512 of the transmitter 502 is communicably coupled to the synchronization unit 522 of the receiver 504 via a synchronization channel 540. The synchronization channel 540 is a dedicated communication pathway or medium that facilitates the exchange of timing and synchronization information between the synchronization unit 512 and the synchronization unit 522. In an example, the synchronization channel 512 may be an optical fiber, an electronic data link, or any other suitable communication medium. Further, timing information, synchronization signals, or control data are transmitted over the synchronization channel 512 to synchronize the activities of the transmitter 502 and receiver 504.

As shown, the post-processing unit 514 of the transmitter 502 includes a transmitter sifting unit 560, a transmitter parameter estimation unit 562, a transmitter security analysis unit 564, a transmitter error correction unit 566, a transmitter privacy amplification unit 568 and a transmitter key verification management unit 570. Similarly, the post-processing unit 524 of the receiver 504 includes a receiver sifting unit 580, a receiver parameter estimation unit 582, a receiver security analysis unit 584, a receiver error correction unit 586, a receiver privacy amplification unit 588 and a receiver key verification management unit 590.

The transmitter sifting unit 560 and the receiver sifting unit 580 operate together to identify the decoy and signal pulses that were both transmitted and received correctly. This is done by comparing the time stamps of the transmitted and received pulses. For example, the transmitter 502 sends a sequence of decoy and signal pulses to the receiver 504. The pulses are spaced evenly in time, with a fixed time interval between each pulse. The transmitter sifting unit 560 generates a sequence of time stamps for each pulse that is transmitted. Similarly, the receiver sifting unit 580 measures the arrival time of each pulse that is received. Thereafter, the transmitter sifting unit 560 and the receiver sifting unit 580 compares the time stamps of the transmitted pulses to the time stamps of the received pulses. If the time difference between the transmitted and received pulses is within a certain tolerance, then the pulse is considered to have been transmitted and received correctly. The transmitter 502 and receiver 504 discard the pulses that were not both transmitted and received correctly. The remaining pulses are used for the next steps of the post-processing protocol.

The transmitter parameter estimation unit 562 and receiver parameter estimation unit 582 estimate the parameters of the decoy and signal pulses, such as the mean photon number and the detection efficiency. For example, the transmitter 502 and the receiver 504 use the transmitter parameter estimation unit 562 and the receiver parameter estimation unit 582, respectively, to estimate the mean photon number of the decoy and signal pulses by comparing the number of pulses that are detected to the number of pulses that are transmitted. Similarly, the transmitter 502 and the receiver 504 use the transmitter parameter estimation unit 562 and the receiver parameter estimation unit 582, respectively to estimate the detection efficiency of their detectors by comparing the number of pulses that are detected to the number of pulses that are incident on the detectors. The estimated mean photon number and detection efficiency are used in the security analysis and privacy amplification steps to determine the security of the shared secret key.

The transmitter security analysis unit 564 and the receiver security analysis unit 584 analyse the security of the protocol by estimating the probability of an eavesdropper being able to obtain the secret key by eavesdropping on the decoy and signal pulses. This is done by using the estimated mean photon number and detection efficiency. If the estimated probability is too high, then the transmitter 502 and the receiver 504 may abort the protocol.

The transmitter error correction unit 566 and receiver error correction unit 586 correct errors, in the shared secret key, which may have been introduced during the transmission. This may be done by using a variety of error correction codes. In an example the error correction codes may be done using a low-density parity-check codes.

The transmitter privacy amplification unit 568 and the receiver privacy amplification unit 588 amplify the secret key by removing any information that an eavesdropper may have obtained. This may be done by using a variety of privacy amplification techniques. In an example, the privacy amplification techniques may be performed by hashing or information reconciliation.

The transmitter key verification management unit 570 and the receiver key verification management unit 590 verify the correctness of the shared secret key by comparing random subsets of the key bits. If these subsets match, it confirms the correctness of the key.

The post-processing unit 514 of the transmitter 502 and the post-processing unit 524 of the receiver 502 are communicably coupled to an authenticated classical channel 592. The authenticated classical channel 592 refers to a secure communication pathway that allows the transmitter's post-processing unit 514 and the receiver's post-processing unit 524 to exchange classical information in a trusted and authenticated manner. The authenticated classical channel 592 plays the role in the final verification steps, confirming that both the transmitter and receiver have derived the same secret key. An example of authenticated classical channel 592 may be a virtual private network tunnel established between the post-processing unit 514 and the post-processing unit 524.

Modifications to embodiments of the present disclosure described in the foregoing are possible without departing from the scope of the present disclosure as defined by the accompanying claims. Expressions such as “including”, “comprising”, “incorporating”, “have”, “is” used to describe and claim the present disclosure are intended to be construed in a non-exclusive manner, namely allowing for items, components or elements not explicitly described also to be present. Reference to the singular is also to be construed to relate to the plural. The word “exemplary” is used herein to mean “serving as an example, instance or illustration”. Any embodiment described as “exemplary” is not necessarily to be construed as preferred or advantageous over other embodiments or to exclude the incorporation of features from other embodiments. The word “optionally” is used herein to mean “is provided in some embodiments and not provided in other embodiments”. It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

The invention claimed is:

1. A method for generating decoy and signal pulses for a Decoy differential phase shift (DDPS) quantum key distribution (QKD) protocol, the method comprising:
- emitting laser light from a laser source;
- modulating intensity of the laser light using at least one intensity modulator,
  - wherein the intensity of the laser light is modulated to generate the decoy pulses having a first mean photon number (MPN) and the signal pulses having a second MPN greater than the first MPN, and
  - wherein the first and second MPNs are associated with the operation of the at least one intensity modulator operable based on a first quantum random number generator (QRNG);
- modulating phase of the decoy and signal pulses using a phase modulator operable based on a second QRNG; and
- attenuating the modulated decoy and signal pulses, using at least one attenuator, for being transmitted under the DDPS QKD protocol.

2. The method as claimed in claim 1, wherein the at least one intensity modulator comprises a single intensity modulator, configured to operate based on a base and a top of a transfer curve used for calibrating bias voltages for the intensity modulation of the single intensity modulator.

3. The method as claimed in claim 2, wherein the base and the top of the transfer curve corresponds to the first and second MPNs of the decoy and signal pulses, respectively.

4. The method as claimed in claim 3, wherein the first QRNG is operable to randomly select the base and the top from the transfer curve to determine the bias voltages used for modulating the decoy and signal pulses with the first and second MPNs, respectively.

5. The method as claimed in claim 4, the first and second MPNs for the modulated decoy and signal pulses, respectively, are in a range of 0.1 to 0.2 MPN and 0.5 to 0.9 MPN, respectively.

6. The method as claimed in claim 3, wherein the first QRNG is further operable to select the base and the top percentagewise from the transfer curve to define percentages of generation of the decoy and signal pulses, respectively, based on a user-defined security threshold.

7. The method as claimed in claim 6, wherein the percentages of the decoy and signal pulses are in a range of 20% to 50% and 80% to 50%, respectively.

8. The method as claimed in claim 1, wherein the at least one intensity modulator comprises first and second intensity modulators, each configured to operate based on a transfer curve tuned with bias voltages for the intensity modulation thereof, and wherein the transfer curve of the first intensity modulator is tuned to operate with a bias voltage responsible to generate the decoy pulses with the first MPN and the second intensity modulator is configured to operate with a bias voltage responsible to generate the signal pulses with the second MPN.

9. The method as claimed in claim 8, wherein the transfer curve of the first and second intensity modulators are tuned to operate with bias voltages responsible to generate:
- the decoy pulses with the first MPN in a range of 0.1 to 0.2 MPN, and
- the signal pulses with the second MPN in a range of 0.5 to 0.9 MPN.

10. The method as claimed in claim 8, further comprising
- splitting the laser light using a first coupler into a first laser light for being directed towards the first intensity modulator and a second laser light for being directed towards the second intensity modulator; and
- combining modulated first and second laser light, using a second coupler, into a modulated single laser light being directed towards the phase modulator.

11. A system for generating decoy and signal pulses for a Decoy differential phase shift (DDPS) quantum key distribution (QKD) protocol, the system comprising:
- a laser source for emitting laser light;
- at least one intensity modulator for modulating intensity of the laser light,
  - wherein the intensity of the laser light is modulated to generate the decoy pulses having a first mean photon number (MPN) and the signal pulses having a second MPN greater than the first MPN, and
  - wherein the first and second MPNs are associated with the operation of the at least one intensity modulator operable based on a first quantum random number generator (QRNG);
- a phase modulator, for modulating phase of the decoy and signal pulses, operable based on a second QRNG; and
- at least one attenuator for attenuating the modulated decoy and signal pulses for being transmitted under the DDPS QKD protocol.

12. The system as claimed in claim 11, wherein the at least one intensity modulator comprises a single intensity modulator, configured to operate based on a base and a top of a transfer curve used for calibrating bias voltages for the intensity modulation of the single intensity modulator.

13. The system as claimed in claim 12, wherein the base and the top of the transfer curve corresponds to the first and second MPNs of the decoy and signal pulses, respectively.

14. The system as claimed in claim 13, wherein the first QRNG is operable to randomly select the base and the top from the transfer curve to determine the bias voltages used for modulating the decoy and signal pulses with the first and second MPNs, respectively.

15. The system as claimed in claim 14, wherein the first and second MPNs for the modulated decoy and signal pulses, respectively, are in a range of 0.1 to 0.2 MPN and 0.5 to 0.9 MPN, respectively.

16. The system as claimed in claim 13, wherein the first QRNG is further operable to select the base and the top percentagewise from the transfer curve to define percentages of generation of the decoy and signal pulses, respectively, based on a user-defined security threshold.

17. The system as claimed in claim 16, and wherein the percentages of the decoy and signal pulses are in a range of 20% to 50% and 80% to 50%, respectively.

18. The system as claimed in claim 11, wherein the at least one intensity modulator comprises first and second intensity modulators, each configured to operate based on a transfer curve tuned with bias voltages for the intensity modulation thereof, and wherein the transfer curve of the first intensity modulator is tuned with a bias voltage responsible to generate the decoy pulses with the first MPN and the transfer curve of the second intensity modulator is tuned with a bias voltage responsible to generate the signal pulses with the second MPN.

19. The system as claimed in claim 18, wherein the transfer curve of the first and second intensity modulators are tuned to operate with bias voltages responsible to generate:

the decoy pulses with the first MPN in a range of 0.1 to 0.2 MPN, and the signal pulses with the second MPN in a range of 0.5 to 0.9 MPN.

20. The system as claimed in claim 18, further comprising a first coupler for splitting the laser light using into a first laser light for being directed towards the first intensity modulator and a second laser light for being directed towards the second intensity modulator; and a second coupler for combining modulated first and second laser light into a modulated single laser light being directed towards the phase modulator.

* * * * *